US010019259B2

(12) United States Patent
Araya et al.

(10) Patent No.: US 10,019,259 B2
(45) Date of Patent: Jul. 10, 2018

(54) CODE TRANSFORMATION USING EXTENSIBILITY LIBRARIES

(71) Applicant: Mobilize.Net Corporation, Bellevue, WA (US)

(72) Inventors: Carlos Araya, Cartago (CR); Olman Garcia, San Jose (CR)

(73) Assignee: Mobilize.Net Corporation, Bellevue, WA (US)

( * ) Notice: Subject to any disclaimer, the term of this patent is extended or adjusted under 35 U.S.C. 154(b) by 0 days.

(21) Appl. No.: 14/676,140

(22) Filed: Apr. 1, 2015

(65) Prior Publication Data

US 2015/0205603 A1 Jul. 23, 2015

Related U.S. Application Data

(63) Continuation-in-part of application No. 14/160,521, filed on Jan. 21, 2014, now Pat. No. 9,459,862, and a continuation-in-part of application No. 13/842,519, filed on Mar. 15, 2013, now Pat. No. 9,465,608.

(60) Provisional application No. 61/758,217, filed on Jan. 29, 2013.

(51) Int. Cl.
| | |
|---|---|
| *G06F 9/45* | (2006.01) |
| *G06F 8/76* | (2018.01) |
| *G06F 8/51* | (2018.01) |
| *G06F 8/41* | (2018.01) |

(52) U.S. Cl.
CPC ............... *G06F 8/76* (2013.01); *G06F 8/456* (2013.01); *G06F 8/51* (2013.01)

(58) Field of Classification Search
CPC .............................................. G06F 8/00–8/78
See application file for complete search history.

(56) References Cited

U.S. PATENT DOCUMENTS

| | | |
|---|---|---|
| 5,313,614 A | 5/1994 | Goettelmann et al. |
| 5,812,851 A | 9/1998 | Levy et al. |
| 6,353,925 B1 | 3/2002 | Stata et al. |
| | (Continued) | |

OTHER PUBLICATIONS

Sneed et al., "Extracting business rules from source code," Program Comprehension, 1996, Proceedings., Fourth Workshop on, Berlin, 1996, pp. 240-247.*

(Continued)

*Primary Examiner* — Chameli Das
*Assistant Examiner* — Joanne Macasiano
(74) *Attorney, Agent, or Firm* — Han Santos, PLLC

(57) ABSTRACT

A transformation application may transform source code into transformed code using extensibility libraries. The transformation application may receive an extensibility library and the source code. The extensibility library may include one or more transformation directives that specify a business semantic preserving transform. Accordingly, the transformation application may transform a source application into a transformed application using the business semantic preserving transform. The business semantic preserving transform may change one or more original architectural classes of the source application potentially spanning multiple tiers or devices into one or more transformed architectural classes of the transformed application, in which the one or more transformed architectural classes are different from the one or more original architectural classes.

20 Claims, 8 Drawing Sheets

(56) References Cited

U.S. PATENT DOCUMENTS

| | | | |
|---|---|---|---|
| 6,356,285 B1 | 3/2002 | Burkwald et al. | |
| 6,542,908 B1 | 4/2003 | Ims | |
| 6,738,967 B1 | 5/2004 | Radigan | |
| 6,862,559 B1 | 3/2005 | Hogg | |
| 7,543,270 B1 | 6/2009 | Grace | |
| 8,191,038 B1 | 5/2012 | Samuel et al. | |
| 8,359,586 B1 | 1/2013 | Orofino et al. | |
| 2001/0044811 A1 | 11/2001 | Ballantyne et al. | |
| 2003/0083900 A1* | 5/2003 | Khriss | G06F 8/74 705/1.1 |
| 2003/0212698 A1 | 11/2003 | Mani et al. | |
| 2004/0054946 A1* | 3/2004 | Atallah | G06F 8/60 714/38.14 |
| 2004/0068716 A1* | 4/2004 | Stevens | G06F 8/47 717/140 |
| 2004/0225952 A1* | 11/2004 | Brown | G06F 8/20 714/819 |
| 2005/0108692 A1 | 5/2005 | Lau et al. | |
| 2005/0177814 A1 | 8/2005 | Martlage | |
| 2006/0070053 A1* | 3/2006 | Andersen | G06F 8/54 717/163 |
| 2006/0100975 A1 | 5/2006 | McMaster et al. | |
| 2006/0236307 A1* | 10/2006 | Debruin | G06F 8/51 717/117 |
| 2007/0169018 A1* | 7/2007 | Coward | G06F 8/51 717/136 |
| 2007/0245320 A1* | 10/2007 | Cotichini | G06F 8/74 717/136 |
| 2007/0245330 A1 | 10/2007 | Lapounov et al. | |
| 2007/0256058 A1 | 11/2007 | Marfatia et al. | |
| 2007/0288751 A1 | 12/2007 | Rits | |
| 2008/0222616 A1* | 9/2008 | Cheng | G06F 8/51 717/137 |
| 2008/0244517 A1 | 10/2008 | Rostoker | |
| 2009/0064091 A1 | 3/2009 | Tonkin et al. | |
| 2009/0077091 A1 | 3/2009 | Khen et al. | |
| 2009/0119773 A1 | 5/2009 | D'Amore et al. | |
| 2009/0313613 A1 | 12/2009 | Ben-Artzi et al. | |
| 2010/0074419 A1 | 3/2010 | Poremba | |
| 2010/0269096 A1 | 10/2010 | Araya et al. | |
| 2010/0287525 A1* | 11/2010 | Wagner | G06F 8/20 717/100 |
| 2011/0055807 A1 | 3/2011 | Mahajan et al. | |
| 2011/0154305 A1 | 6/2011 | LeRoux et al. | |
| 2011/0179347 A1 | 7/2011 | Proctor et al. | |
| 2011/0185354 A1 | 7/2011 | Tanner et al. | |
| 2011/0296391 A1 | 12/2011 | Gass et al. | |
| 2011/0314445 A1 | 12/2011 | Dutta et al. | |
| 2011/0320588 A1 | 12/2011 | Raleigh | |
| 2012/0185821 A1 | 7/2012 | Yaseen et al. | |
| 2012/0192163 A1 | 7/2012 | Glendenning et al. | |
| 2013/0073614 A1 | 3/2013 | Shine et al. | |
| 2013/0125098 A1 | 5/2013 | Dhoolia et al. | |
| 2013/0145346 A1 | 6/2013 | Liu et al. | |
| 2013/0198720 A1 | 8/2013 | Maurice et al. | |
| 2014/0317591 A1* | 10/2014 | Rosomoff | G06F 8/70 717/101 |
| 2015/0278336 A1 | 10/2015 | Wadhwani et al. | |

OTHER PUBLICATIONS

Kalsing et al., "An Incremental Process Mining Approach to Extract Knowledge from Legacy Systems," 2010 14th IEEE International Enterprise Distributed Object Computing Conference, Vitoria, 2010, pp. 79-88.*

U.S. Appl. No. 14/160,521—Non Final Office Action dated Mar. 16, 2015, 45 pages.

U.S. Appl. No. 13/842,519—Non Final Office Action dated Jan. 14, 2015, 50 pages.

U.S. Appl. No. 14/160,521—Final Office Action dated Sep. 24, 2015, 56 pages.

U.S. Appl. No. 13/842,519—Final Office Action dated Nov. 4, 2015, 60 pages.

Razavi et al., "Partial Evaluation of Model Transformations." Proceedings of the 34th International Conference on Software Engineering. IEEE Press, 2012.

U.S. Appl. No. 13/842,519—Notice of Allowance dated Feb. 29, 2016, 14 pages.

U.S. Appl. No. 14/160,521—Notice of Allowance dated Mar. 14, 2016, 29 pages.

U.S. Appl. No. 14/686,766—Non-Final Office Action dated Jan. 15, 2016, 40 pages.

Zou, Ying. "Quality Driven Software Migration of Procedural Code to Object-Oriented Design." Software Maintenance, 2005. Engineering. IEEE Press, 2012.

Final Office Action dated Jul. 5, 2016 in U.S. Appl. No. 14/686,766, 32 pages.

Office Action dated Nov. 29, 2016 in U.S. Appl. No. 14/686,766, 35 pages.

Final Office Action dated Jun. 29, 2017 in U.S. Appl. No. 14/686,766, 28 pages.

Office Action dated Nov. 16, 2017 in U.S. Appl. No. 14/686,766, 22 pages.

* cited by examiner

800

802
Transform at least one source application component of a first set of grammars into one or more transformed application components of a second set of grammars based at least on the one or more transformation directives of an extensibility library 804
Transform a source application component into multiple transformed components or multiple source application components into a single transformed application component based at least on the one or more transformation directives of the extensibility library 806
Perform other transformations on one or more source application components based at least on the one or more transformation directives of the extensibility library

Figure 8

CODE TRANSFORMATION USING EXTENSIBILITY LIBRARIES

RELATED APPLICATIONS

This patent application is a continuation-in-part of application Ser. No. 14/160,521, titled "Automated Porting of Application to Mobile Infrastructures," filed Jan. 21, 2014 which claims the benefit of Provisional Application No. 61/758,217, titled "Automated Porting of Applications Across Enterprise Infrastructures" filed Jan. 29, 2013, and is a continuation-in-part of application Ser. No. 13/842,519, titled "Code Separation with Semantic Guarantees" filed Mar. 15, 2013, all of which are incorporated by reference in full herein.

BACKGROUND

Software applications, such as accounting, finance, and customer relations applications, may constitute a large, ongoing investment by an enterprise or other organization. For example, an enterprise information technology ("EIT") organization may invest in the initial requirements gathering and design of an application. Then EIT may invest in the software programming, development and testing of the application. Next enterprise data will have to be entered or ported into the application. Finally the application will be deployed, often constituting an expense of both hardware and/or training.

As the application is used and modified during its lifecycle, the application accrues modifications and bug fixes, as well as an accretion of business unit information technology ("BUIT") satellite applications. In this way, an ecosystem builds around the original software application. Eventually the application may become relied upon by the enterprise as the embodiment of the enterprise's policies. Thus, a software application not only represents a financial investment, but also an institutionalization of the enterprise's business procedures.

However, technology platforms evolve and business needs and policies evolve. An example of the former is where an initial investment in a two tier client server software architecture may give way to three tier enterprise data center based architectures which in turn evolve into web based applications and cloud based applications, each time causing applications to be ported to the newer software architectures. Another example of the former is where programming languages and frameworks become deprecated, such as where Microsoft Visual Basic.NET™ and the .NET application framework was not fully backwards compatible with Microsoft Visual Basic 6 and its Component Object Model based infrastructure, giving rise to applications being ported. An example of the latter is where the C Standard Library <string.h> library was later found to be susceptible to buffer overrun security attacks, causing applications to be moved to fixed buffer equivalents.

Typically, porting an application to a new software architecture, or platform causes a full rewrite. Since the rewrite is to a new architecture, or platform, or represents some other form of code refactoring, the port will not behave exactly in the same way as before. For example, a personal computer based client application may be ported to a mobile device. Accordingly, the functionality of the ported application on mobile device will differ at least according to the form factor change.

The functionality change causes risk that the semantics of the rewrite will not exactly conform to the behavior of the original application. If this were to happen, BUIT satellite applications and other software applications interfacing with the original application may break.

This state of affairs leaves EIT organizations on the horns of a dilemma. The extension of the lifecycle of their mission critical software applications may rely on a successful port to a new architecture or platform. But to do so, the EIT organization may have to risk a non-conforming port. In other words, the EIT organization cannot rely on semantics to be preserved during a port.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

FIG. 8 is a flowchart of an exemplary operation that transforms source application components into transformed application components based on transformation directives from an extensibility library.

DETAILED DESCRIPTION

Transformations, Code Separation and Semantic Guarantees

Figure 1:
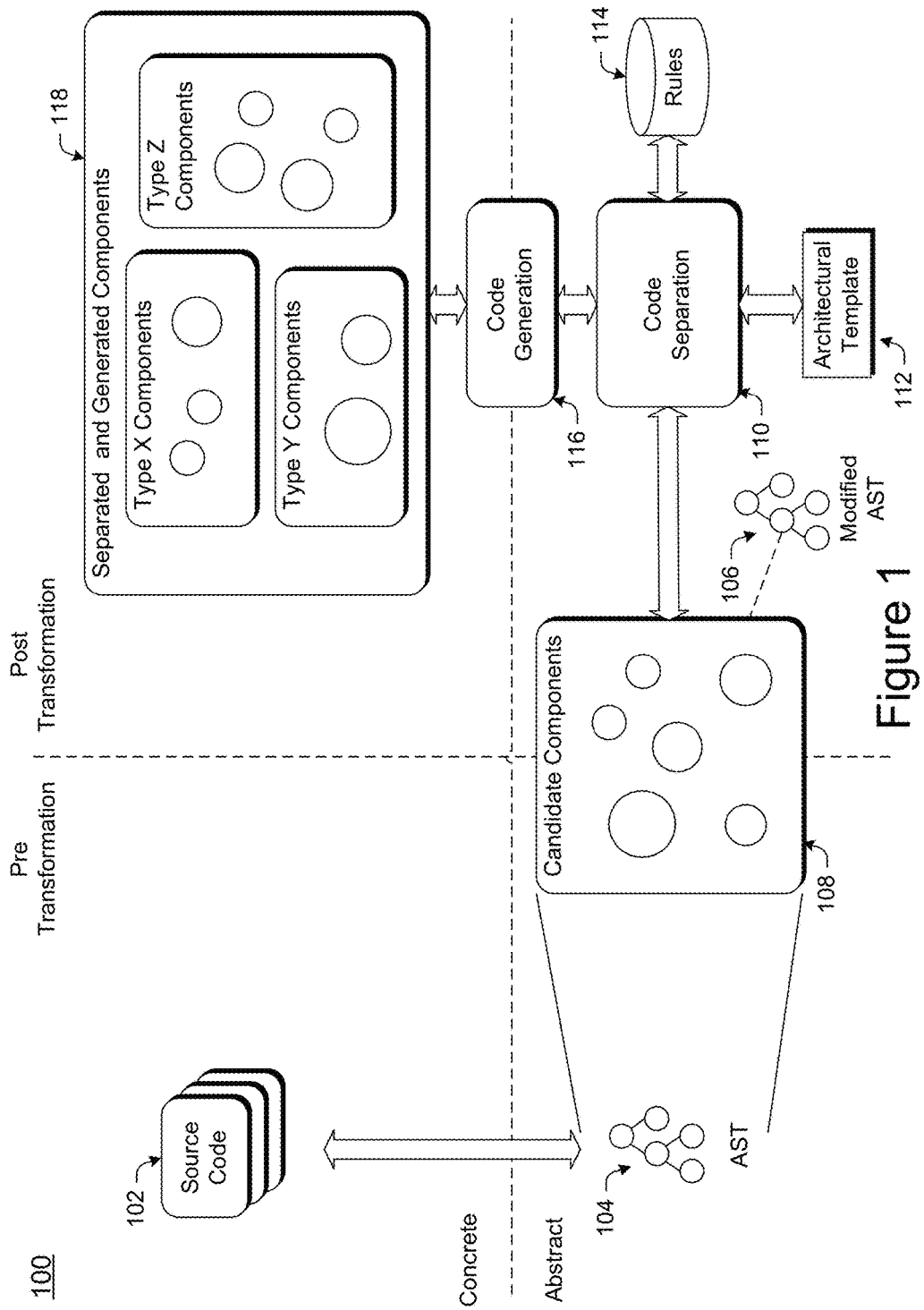
FIG. 1 is a top level context diagram for code separation with semantic guarantees.

This patent application discloses automated code transformations of software applications where the transformation includes separating the code into components corresponding to a target architecture while guaranteeing semantic equivalence. The automated code transformation of software applications as described in this patent application is performed by a transformation application that uses, at least in part, an extensibility library. The extensibility library may contain transformation directives that are otherwise unavailable to the transformation application. In this way, the ability of the transformation application to use an extensibility library may enable the transformation application to access new or supplemental transformation directives without being modified. Modern software applications are generally organized into separate components. Components may be loosely or tightly coupled and may have high or low degrees of cohesion. Accordingly, components are not merely functional blocks of code, but also include an invocation interface where the interface guarantees specific semantic behavior. In object oriented programming, a component's invocation interface is sometimes referred to as a "contract" thereby emphasizing the guarantee of specific semantic behavior. For various components, such as a component of high complexity, the invocation interface of the component may be an application program interface (API). In fact, an API may be an interface into an individual component, a design pattern, a component class, or an architectural class.

Components are not homogenous. Components typically take on specialized roles in interacting with other components. In this way, components may be organized into parts of a larger software machine and may expand into multiple layers and programming platforms implementing programming patterns. For example in object oriented programming, design patterns are component interaction patterns where a generic component type may be specialized according to a particular application. For instance, one design pattern is the strategy design pattern where an abstract class is replaced with a concrete class depending on the context of a situation. Thus concrete components may take on the type of an abstract class.

Design patterns typically apply only to a part of a software application. However, there are patterns, called software architectural patterns, which cover an entire software application. Example software architectural patterns are model-view-controller ("MVC"), model-view ("MV"), and model-view-viewmodel ("MVVM") patterns. Software architecture design is often driven by a platform. Specifically, a platform is the set of hardware and/or software that hosts and executes the software. A platform generally comprises hardware, an operating system, standard libraries and/or a software application framework. In the case of a virtual execution environment, the platform may not necessarily specify physical hardware but virtual hardware and an execution environment or virtual machine. In this way a platform describes the support infrastructure for a software application. As a result, a platform may describe the hardware architecture and platform software corresponding for various portions of a software architecture. For example, a mobile device may correspond to a client and a cloud based service may correspond to a web service. Thus an architecture, software or hardware or both, may give rise to generic classes of components, known as component types. An architecture class may be a collection of one or more component types. Furthermore, one or more components may constitute an architecture class.

Functionally Equivalent (Semantics Preserving) Transformations, Automation, and Abstract Syntax Trees Porting a software application involves porting the software application's source code. Typically source code is written in one or more programming languages, each programming language having its own grammar. Early applications were written in a single programming language, such as FORTRAN or COBOL. Present enterprise applications are often written in multiple programming languages, often in the same source code file. For example, an application may use a structural language like Microsoft Visual Basic for procedures, but structured query language ("SQL"), for database access. By way of another example, web clients typically use some combination of hypertext markup language ("HTML"), cascading style sheets ("CSS"), and JavaScript.

As a result, in addition to porting to a different architecture, porting source code may involve transforming code expressed in multiple input grammars that represent the programming languages of the source code of the application to be ported, into code expressed in multiple output grammars representing the programming languages of the source code of the application after being ported. Enterprise applications, especially those that have been in operation for a relatively long time, are generally complex, may be large, and may be a hodge-podge of different programming languages and approaches as varied as the programmers who maintained the application.

Due to its complexity, porting an enterprise application is therefore a candidate program for computer automation. Specifically, the goal of a successful port is not only to achieve the architectural change and the translation across grammars, but also to preserve the semantics of the application's business logic after the porting process. That is to say, any invocation of the business logic post port should have the same behavior as prior to the port.

The emphasis on preserving semantics has the effect of de-emphasizing syntax. An automated approach to a port across architectures cannot be a naïve syntactic translation of the original components to the exact same components except in a different programming language. One approach to automating the porting process involves receiving input grammars and output grammars, developing a composite grammar, representing the application in an abstract syntax tree that supports the composite grammar. The abstract syntax tree may be annotated with transformational rules that impact either a node in the abstract syntax tree, all nodes in a sub-tree of the abstract syntax tree, or the entire abstract syntax tree. In this way, porting can be effected by traversing the abstract syntax tree and using the transformational rules in the annotations to determine what output code to generate.

The Notion of Code Separation

However, after a port, the architectural changes and grammar changes will change some of the functionality of original application vis-à-vis the ported application. At the very least, the ability to run on a new architecture constitutes a functional change. With an architectural change, components in the original application may not have a one to one correspondence with components in the ported application. Thus during a port, a decision is made as to which semantics are to be preserved.

Code separation is the process of identifying which portions of the source code of the original application map to different portions of a target architecture. Correctly separating code is the basis for a successful port. Consider the case where an application's client application was originally targeted for a personal computer but is being ported to a mobile phone. The user interfaces of the client applications will differ due to the form factor change. However both client applications should be able to expect that interactions with the business logic will be the same as in the original application. Therefore, separating code for the client from code for the business logic provides a basis for determining which semantics to preserve during a port.

Code Separation and Different Transformations

Code separation will have a varying role in an application port depending on the transformation to be achieved. A transformation is a deterministic alteration of source code to achieve a desired result. Since a transformation is achieved by the application of a deterministic algorithm, typically the transformation may be reversed by applying the inverse of the algorithm. However, transformations are not necessarily commutative.

Some transformations will not involve code separation. For example, a pure language port that does not involve an architectural change is less likely to use code separation. Language based changes such as compilation, or insertion of artifacts such as debug information, tend to preserve architecture.

However, other transformations will rely on code separation. In particular, changes in hardware architecture, such as porting from a single core computer processing unit ("CPU") to a multi-core CPU, or to a system-on-a-chip ("SoC"), give rise to new hardware capabilities. Therefore the porting process will identify functionality in the original application that may take advantage of the new hardware. Similarly, porting software to a new framework, such as from COM to .NET, or to a new software architecture, such as a from two-tier client server to a web based services oriented architecture ("SOA") is likely to rely on code separation since the component types in the original application will not have a one to one correspondence to the components types of the targeted architecture. In general, the greater the difference in architecture of the original application to the targeted architecture, the greater the reliance on code separation.

Differences in component types are not necessarily based on architecture. Some transformations, such as performance optimizations and code refactoring are not re-architecting transformations. For example, components may be combined into a single dynamic link library ("DLL") to improve load times. Similarly, during refactoring, analysis may identify redundant code and consolidate functionality accordingly. Automated modifications to support a global business policy change in an application may also use code separation as some components likely to embody the policy may be assigned a distinct component type.

The Context of Code Separation with Semantic Guarantees

Having introduced code separation, we turn now to the automation of code separation. FIG. 1 is an exemplary context diagram 100 for code separation with semantic guarantees. Specifically, an automated software application transformation may be considered in terms of moving from concrete terms to abstract terms, as represented by the horizontal dotted line, and in terms of moving from pre-transformation, i.e., the original application, to post-transformation, i.e., the ported application.

Source code 102 comprises a concrete representation of the original application. Source code 102 is typically in the form of source code files and is generally written in one or more programming languages, each programming language represented by a grammar.

The source code 102 may be statically analyzed, and represented in an annotated abstract syntax tree 104, which supports the input grammars of the programming languages in the original application. The annotations in the abstract syntax 104 tree represent transformational rules that impact either a node in the abstract syntax tree 104, all nodes in a sub-tree of the abstract syntax tree 104, or the entire abstract syntax tree 104. Thus code generation may be effected by a traversal of the abstract syntax tree 104 while applying the transformational rules.

It is to be noted that the abstract syntax tree 104 is not necessarily a static structure. Specifically, during processing, the abstract syntax tree 104 may be modified and re-modified dynamically. At any one point in time, there may be a transformed or modified abstract syntax tree 106 that is used for processing. The modified abstract syntax tree 106 is shown in the post-transformation side of FIG. 1 and the abstract side of FIG. 1. The modified instance of the abstract syntax tree 106 is transformed from the original abstract syntax tree 104. In practice, during processing, different instances of data may populate either the original abstract syntax tree 104 and/or the modified abstract syntax tree 106. Thus, it is to be emphasized that there is not necessarily a single static abstract syntax tree used during processing.

However, code generation will also include separating code into components. Code separation starts with identifying candidate components 108 by querying the abstract syntax tree 104. A code separation function 110 analyzes the candidate components 108 in view of an architectural template describing the target architecture 112, i.e., the architecture the original application is being ported to, and transformational rules 114. Note that the transformational rules 114 may be part of the abstract syntax tree 104 or may be stored separately. For example, the transformation rules 114 may include transformation directives from extensibility libraries. The extensibility libraries may be hand coded by a user, or automatically generated by a directive generation function based on configuration settings inputted by the user. The code separation process is described in more detail with respect to FIG. 3.

Once the code separation function 110 has identified how code from the original application is to be mapped to components in the target architecture, a code generation function 116 may commence. During the code generation, in additional to translation to new languages the components of the target architecture may be wrapped with code to facilitate operation in the target architecture, and may be connected to additional infrastructure elements, such as a run-time to optimize execution. Accordingly, the code generation function 116 may generate transformed code 118 from the source code 102 and/or from the pre-modified abstract syntax tree 104 and/or the modified abstract syntax tree 106.

Exemplary Hardware Platform

Figure 2:
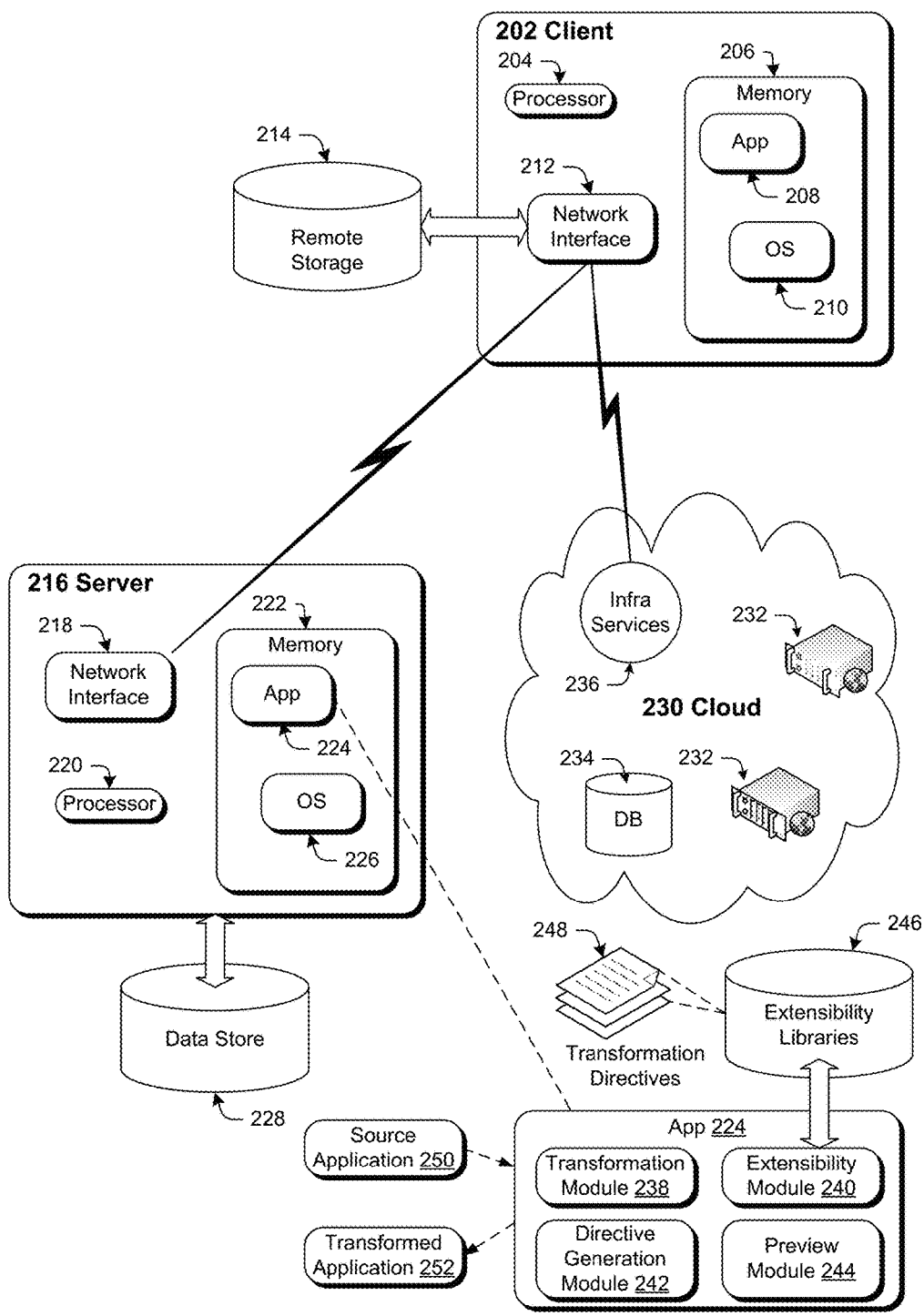
FIG. 2 is a hardware diagram of an exemplary hardware and software platform for code separation with semantic guarantees.

FIG. 2 illustrates one possible embodiment of a hardware environment 200 for code separation with semantic guarantees. Client device 202 is any computing device. A client device 202 may have a processor 204 and a memory 206. Client device 202's memory 206 is any computer-readable media which may store several programs including an application 208 and/or an operating system 210.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a network interface 212. The network interface 212 may be one or more network interfaces including Ethernet, Wi-Fi, or any number of other physical and data link standard interfaces. In the case where the programming language transformations are to be done on a single machine, the network interface 212 is optional.

Client device 202 may use the network interface 212 to communicate to remote storage 214. Remote storage 214 may include network aware storage ("NAS") or may be removable storage such as a thumb drive or memory stick.

Client device 202 may communicate to a server 216. Server 216 is any computing device that may participate in a network. Client network interface 212 may ultimate connect to server 216 via server network interface 218. Server network interface 218 may be one or more network interfaces as described with respect to client network interface 212.

Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 222 may also store applications 224 that may include a database management system. Accordingly, server 216 may include data store 228. Data store 228 may be configured as a relational database, an object-oriented database, and/or a columnar database, or any configuration to support policy storage. The application 224 may perform software application transformation using code separation with semantic guarantees. The application 224 may also perform other operations. These operations may include comparisons of source codes and transformed codes that are generated from the source codes via one or more application user interfaces. The operations may further include providing for the review of source codes and transformed codes, preview of the execution of the source codes and the transformed codes, export of the transformed code, and/or so forth. In at least one embodiment, the application 224 may include a transformation module 238, an extensibility module 240, a directive generation module 242, and a preview module 244. Each of the modules may include routines, programs, instructions, objects, and/or data structures that perform particular tasks or implement particular abstract data types.

The transformation module 238 may perform code transformation using code separation with semantic guarantees. For example, the transformation module 238 may receive source code from the client device 202 via the network interface 212. In turn, the transformation module 238 may transform the source code into transformed code using code separation with semantic guarantees. The source code and the transformed code may be for different scenarios that include different target architecture requirements, different optimization requirements, different user cardinality requirements, different sets of hardware form factors, different sets of hardware platforms, different execution performance requirements, and/or different programming languages. However, the transformation of the source code into the transformed code is business semantic preserving due to the semantic guarantees. In other words, the business logic of the source code is semantically preserved as the source code is transformed into the transformed code, such that the transformed code can be used to achieve the same semantic effect (e.g., one or more business objectives) as the source code.

The extensibility module 240 may provide the application 224 with the ability to import transformation rules in the form of extensibility libraries 246. The extensibility libraries 246 may contain transformation directives 248. For example, an extensibility library may include one or more transformation directives that are used by the transformation module 238 to perform the code separation function 110 and/or the code generation function 116. In various embodiments, the transformation directives 248 may specify any combination of one or more transformations. For instance, the transformation directives 248 may specify that one or more source code portions of the source code 102 is to be transformed with respect to a target execution scenario, a target execution platform, or a target form factor. The transformation directives 248 may further specify a target localization, a target application of user interface skinning, or a target programming language that differs from the original programming language of the one or more source code portions. The transformation directives 248 may also specify that the one or more source code portions of the source code 102 are to be transformed with respect to a target debugging implementation, a target profiling implementation, a target insertion of a pre-condition assertion into a source code portion or a target insertion of a post-condition assertion into a source code portion.

For example, a target execution scenario may include a combination of a target execution platform and a target localization. Localization may involve the conversion of the one or more source code portions to suit the usage of the one or more code portions in different locales. In one illustrative instance, localization may involve the conversion of the one or more source code portions such that the execution of these code portions produce Unicode-encoded text rather than ASCII-encoded text. In another example, a target debugging implementation may specify the insertion of a debug breaking point or a trace debugging instruction into a source code portion. The target profiling implementation may involve the insertion of profiling code into a source code portion, in which the profiling code enables application performance (e.g., execution speed, data throughput, etc.) to be evaluated at a particular profiling point during execution of the source code portion. Accordingly, target transformations of the source code 102 may be implemented individually or in any combination through the use of the transformation directives. The use of the transformation directives 248 during the performance of the code separation function 110 or the code generation function 116 may produce transformed code portions that differ from source code portions in at least one of cardinality, grammar, hardware platform paradigm, and so forth. In some instances, the use of the transformation directives 248 may cause a transformation of a single source application component into multiple transformed application components through code separation.

Accordingly, the use of the transformation directives 248 during the performance of the code separation function 110 or the code generation function 116 on a source application 250 may produce a transformed application 252 that differs in one or more architectural classes from the source application 250. An architectural class is a configuration of components that is designed to effect a specific data processing and information flow in order to abstract away the physical configuration of the underlying hardware. For example, where the underlying hardware is expected to be a client to cloud configuration, an example architectural class might be the model-view-viewmodel (MVVM) architectural class. MVVM abstracts away the distance from the client to the cloud, the latency inherent in an HTTP connection. Thus, a MVVM application may be a customer relationship management (CRM) application or a health database, yet regardless of the kind of data processed, the flow of the data and data processing, as embodied in an architectural class remains the same.

A consequence of the architectural class being derived from the underlying hardware platform is that if an application is to be ported to another hardware platform, the architectural class is likely to change. The notion of an architectural class allows a technician to detect the degree of complexity in a port. If a two-tier client server application is being ported to a mobile platform, then a new architectural class that takes into account mobile latency may be used, and the port of the application will be across different architectural classes. In a contrasting example, if a three-tier application is simply changing the database vendor, but the application is still a three-tier application, then the architectural class will not change across the port, and the transformation is not as complex.

In this way, an architectural class reflects that an application may be subdivided into components where the components interrelate to achieve a specific data flow across substantively the entire application. For example, one or more components may have a particular component type in the architectural class, in which a component type corresponds to a tier or partition of the architecture class. Multiple components may also constitute a component class, which in turn may be a partition or a tier of an architecture class. Analogously, an architectural class is to an application comprised of components as a design pattern is to object-oriented program in object oriented programming, and an abstract data type/structure is to a structured program in structural programming. However, since an architectural class covers substantively an application, an architectural class is often comprised of design patterns acting in concert. For example, a model-view-controller architectural class is an aggregation/combination of the Observer design pattern and the Composite design pattern.

Thus, unlike design patterns and abstract data types/structures that may comprise only a component, an architecture class may cover substantially the entire application, in which the application may be comprised of multiple executables and binaries. For this reason, architectural classes are often implemented with multiple programming languages and grammars.

A port of an application to a different architectural class may disrupt the underlying data flow of an application. Therefore, an automated port may be configured to verify that the business semantics are preserved across the port. As a result, a port of an architectural class is enabled not merely by a naïve mapping of one implementation to another, as in that of a database change in a three tier application, but rather by a transformation engine that is able to detect structure of individual components, across multiple languages, and make porting transformations based on that detected structure. Without this capability, such a transformation could not guarantee preservation of semantics.

In other words, the transformation directives 248 may be used to produce a transformed application having transformed code portions that differ from source code portions of a source application, while preserving the business semantics of the source application. In one example, a transformation directive may specify an architectural model that transforms a legacy application component into multiple transformed application components of a multi-tier framework. In such an example, the multi-tier framework may include a web user interface component, a middleware component, and a database component. However, in other embodiments, the transformation of an application component into multi-tiered framework components may also be accomplished using multiple extensibility libraries. In such embodiments, each extensibility library may be responsible for the transformation of the application component into a particular multi-tier framework component. In other instances, the use of the transformation directives 248 may cause a transformation of multiple source application components into a single transformed application component. For example, a transformation directive may specify that a user interface component and a middleware data processing component of a legacy application are to be transformed into a single transformed application that handles both user interaction and data processing.

Alternatively or concurrently, the use of the transformation directives 248 may produce transformations that cause a change in the language, i.e., grammar, of the source code components. For example, a transformation directive may specify that an application that is written in Visual Basic (VB) is to be transformed into multiple components of different languages. In such an example, the components may include a web user interface component that is constructed using hypertext markup language (HTML), cascading style sheets (CSS), and JavaScript, a middleware component that includes C Sharp applets, and a back end component in the form of a SQL database. In an additional example, another transformation directive may specify an opposite transformation process.

Some of the transformation directives 248 may explicitly specify transforms that produce transformed code portions that differ from the source code portions in at least one of cardinality or grammar. However, in other embodiments, the differences in at least one of cardinality or grammar may be produced by the code separation function 110 and/or code generation function 116 of the application 224 in response to transformation directives. For example, such transformation directives may be directives that specify target execution scenarios and/or target form factors.

In various embodiments, the extensibility module 240 may register one or more of the extensibility libraries 246 with the transformation module 238 based on user inputs. For example, a user may use a user interface that is provided by the extensibility module 240 to select one or more of the extensibility libraries 246 for usage during the transformation of a particular application. Accordingly, once the one or more extensibility libraries are registered, the transformation module 238 may transform source code portions of the particular application into transformed code portions using the one or more extensibility libraries.

The use of the extensibility libraries 246 enables the application 224 to perform the code separation function 110 and/or the code generation function 116 based on transformation rules that are not natively available to the application 224. The use of the extensibility libraries 246 also means that application 224 is able to implement these non-native transformation rules without being modified. In some embodiments, the application 224 may store the extensibility libraries 246 in the data store 228 or in a database that implemented in the cloud.

The directive generation module 242 may generate extensibility libraries, such as the extensibility libraries 246. In various embodiments, the directive generation module 242 may receive a target architecture for an intended transformation product application. The directive generation module 242 may compare the target architecture with an original architecture of a source application. As further described below, the comparison may enable the directive generation module 242 to infer code separation directives, code transformation directives, and/or grammar translation directives that provide a business semantic preserving transform. The directive generation module 242 may package the transformation directives into an extensibility library. For example, the directive generation module 242 may combine the transformation directives into the extensibility library in such a way that obscures the transformation details of the one or more transformation directives.

Alternatively, the directive generation module 242 may modify an existing extensibility library of transformation directives that specifies a particular business semantic preserving transform for an existing target architecture according to an additional target architecture. In this way, the directive generation module 242 may generate a modified extensibility library that specifies a different business semantic preserving transform that corresponds to the additional target architecture. For example, the directive generation module 242 may filter out one or more transformation directives from the existing extensibility library based on the target architecture. In various embodiments, the transformation directive in an extensibility library may specify a business semantic transform that is guaranteed by annotations in an abstract syntax tree of an original software application.

In some embodiments, the directive generation module 242 may have an export function that enables the extensibility library to be exported to a designated file directory or a remote storage location. In alternative configurations, the directive generation module 242 may be a standalone application rather than a part of the application 224.

The preview module 244 may provide an execution preview interface that enables a user to view the execution of code portions of the transformed code without the use of a separate IDE. In various embodiments, the preview module 244 may provide debug information, assertion information, and profiling information during the execution of the code portions. For example, the debugging information may be from trace debugging instructions and debugging breakpoint codes, and the profiling information may be from the executing of profiling codes. In other embodiments, the preview module 244 may display indicators on a user interface to indicate an amount of confidence that the application 224 properly transformed an original code portion to a transformed code portion. The measure of confidence may be based on an evaluation of how well the application 224 performed the code separation.

During the code separation, the code separation algorithm of transformation module 238 may generate a measure that estimates whether an original code portion of a source code 102 maps to a user interface portion of the target architecture or a business logic portion of the target architecture. As such mapping is influential in whether the original code portion is properly transformed. In various instances, the measure may be a transformation accuracy confidence value on a numerical scale, e.g., a numerical value in a numerical range that varies from 1 to 10.

In other embodiments, the transformation module 238 may generate a functionality preservation confidence level for the business semantic transformation of the one or more original architectural classes of a source application into one or more transformed architectural classes of the transformed application. The functionality preservation confidence level may be generated based on a comparison of the execution results of the source application and the transformed application. In various instances, the functionality preservation confidence level may be provided based on a numerical scale, e.g., a numerical value in a numerical range that varies from 1 to 10. The numerical value may indicate the similarity between the execution results provided by the source application and the transformed application.

Accordingly, the preview module 244 may cause the user interface to show different indicators that correlate with different transformation accuracy confidence values and/or functionality preservation confidence values. For example, a transformed code portion may be highlighted with a specific shade of a particular color or a particular color of different colors to show a transformation accuracy confidence value for the transformed code portion. In another example, the preview module 244 may cause the user interface to display a functionality preservation confidence value associated with the transformed code portion. In some embodiments, the transformation accuracy confidence value or the functionality preservation confidence value may be displayed with identities of transformation directives or identities of extensibility libraries used to direct the transformation.

Server 216 need not be on site or operated by the client enterprise. Server 216 may be hosted in a cloud 230. Cloud 230 may represent a plurality of disaggregated servers which provide virtual web application server 232 functionality and virtual database 234 functionality. Cloud 230 services 232, 234 may be made accessible via cloud infrastructure 236. Cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS").

Figure 3:
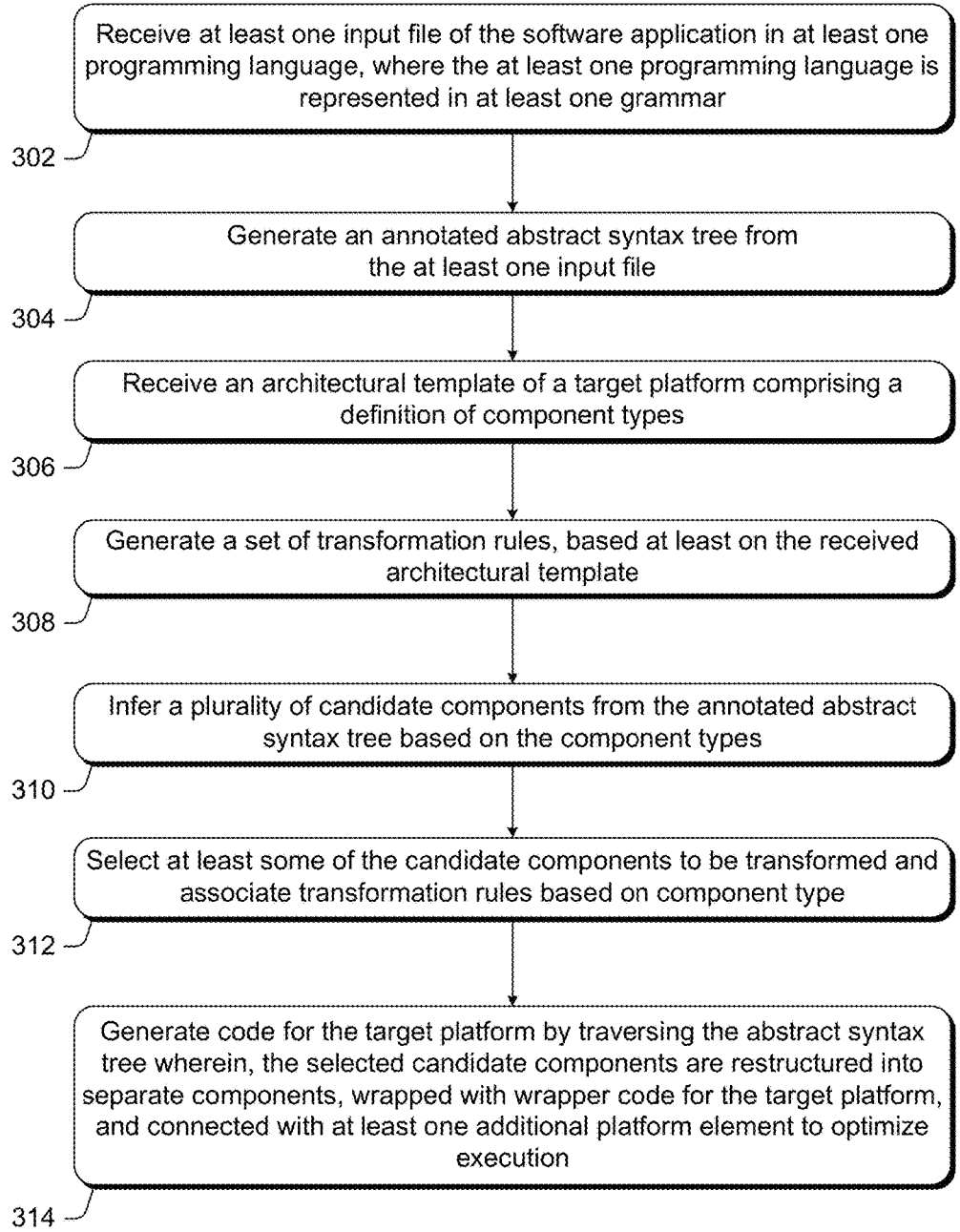
FIG. 3 is a flowchart of an exemplary operation of a software application transformation using code separation with semantic guarantees.

Example Operation of Performing a Software Application Transformation Using Code Separation with Semantic Guarantees Software application ports are a form of software application transformation. Where the application architecture is to change, or where the application transformation gives rise to changes in component types, code separation techniques that preserve semantics are to be brought to bear. FIG. 3 illustrates a flowchart 300 of the example operation of performing a software application transformation using code separation with semantic guarantees.

In block 302, input comprising source code is received. Source code may be in the form of files written in one or more programming languages, each programming language represented in a grammar.

A code separation function may access the source code transformed into an abstract syntax tree that supports the input grammars of the source code of the original application as well as the output grammars of the target architecture, i.e., the architecture of the ported application. The abstract syntax tree may be annotated with transformational rules.

In block 304, an annotated abstract syntax tree is generated from at least one of the source code files of the original application. In this way, a port of a selected portion of the original application or a complete port of the entire original application may be effected.

In block 306, the code separation function receives an architectural template. The architectural template may describe a hardware architecture and/or a software architecture. The architectural template may describe solely the target software architecture, or may additionally describe a target platform comprising a target hardware architecture and support software such as an operating system, support libraries and/or frameworks, or an execution environment or virtual machine. In the case where the architectural template describes the target platform, the architectural template may also describe the advantages and disadvantages of the target platform. For example, where the target platform is distributed, the architectural template may indicate where performance may be degraded by network connections due to remote communications. By way of another example, the architectural template may indicate strong parallel processing capabilities, as in a server. In this way, the architectural template may provide input that may weigh the selection of components for a corresponding component type.

The architectural template will provide the basis for defining component types. For example, a software architecture may prescribe a client tier, a business logic tier, and a persistence tier. Each of these tiers may represent a component type. Other software architectures include examples such as model-view-controller, model-view, and model-view-viewmodel. The specific example of model view viewmodel is discussed in more detail with respect to FIG. 5.

Alternatively, the architectural template may represent a business architecture instead, where each component type enumerates a function corresponding to the organization of the business enterprise such as departments and cost centers.

In the case of hardware architectures, the architectural template may describe a cloud infrastructure using a service oriented architecture accessed by mobile devices. The architectural template may include information about additional functionality present in the target cloud architecture such as that exposed by Platform as a Service, Infrastructure as a Service, and Software as a Service functionality.

In block 308, the existing transformational rules in the annotated abstract syntax tree are augmented with a generated set of transformational rules specific to the received architectural template. Example transformational rules would include the generation of wrapper code corresponding to the component types described in the architectural template. Wrapper code may include simple "plumbing" code that allows invocation in the new architecture. For example, components that were once local to each other may be transformed into remote components invoking each other via remote procedure call ("RPC"). Other transformation rules may include converting components from stateful to stateless components where they are to reside in a middle tier. In some cases, instead of wrapper code, a component may be transformed by invoking a platform element to optimize execution. Platform elements may include prebuilt platform rearchitecture agents containing code artifacts for the target platform. For example, the platform elements for a web page may include prebuilt hypertext markup language ("HTML"), cascading style sheet ("CSS") and JavaScript files.

Note that it may be desirable for an architectural template to describe different transformation options for the same component type. For example, in a mobile device client scenario, a technician may desire to support both Apple iOS™ and Google Android™ embodiments of a client. In this case, components that have a client component type will have two sets of transformation rules, a first set corresponding to transforming the client components into an Apple iOS™ mobile client, and a second set corresponding to transforming the client components into a Google Android™ mobile client.

Not all transformation rules are driven by the architectural template. For example, the transformations translating the source code to the programming languages of the target architecture need not be generated from the architectural template.

Once the transformation rules specific to the architectural template are generated, the code separation function determines which components to apply those transformation rules. In block 310, the annotated abstract syntax tree is queried for candidate components. Candidate components are functional blocks with an invocation interface whose semantic behavior is guaranteed. The candidate components are inferred to be of a component type in the architectural template. Inferring candidate components to be of a specific component type is described in more detail with respect to FIG. 4.

Once the candidate components are associated with component types, in block 312, at least some candidate components are selected for transformation. In some cases, all the candidate components are selected. However, in other cases, a technician may be reviewing the candidate components via an integrated development environment ("IDE") or some other development tool, and may opt to override the inferences made in block 310. Based on these selections, the abstract syntax tree may be further annotated with additional transformation rules, where these additional transformation rules are associated with the selected components. If the additional rules are added while a code generation is in progress, then the code generation may be reperformed via an IDE or development tool.

In general, an IDE or development tool provides the opportunity to monitor the status of a code generation in progress. For example, a log of operations against the abstract syntax tree, such as annotated, component identification, component type identification, and repositioning may be viewed. Particularly large and complex trees may take a relatively long time, thus the log may be viewed substantially in real time. Accordingly, an IDE or development tool may receive input from a technician to modify a code generation operation while in progress.

Where the IDE or development tool receives input from a technician, the components in the abstract syntax tree directly affected by the input are identified. Since the abstract syntax tree effectively stores information about components affected by other components changing, usually in the form as storing components in an affected component's subtree. Thus the IDE or development tool can identify all components dependent on components directly affected by a change. Thus if a code generation is in progress, code generation for the directly affected components as well as their dependent components may be reperformed. In this way, correct code may be generated despite an input change from a technician, without forcing a full code regeneration of the entire abstract syntax tree.

An IDE or development tool may access an arbitrary abstract syntax tree. Therefore, an IDE or development tool may manage transformations on different abstract syntax trees. Conversely, an abstract syntax tree may store as plurality of transformation rules for the same components in its annotations. For example, client components may be annotated with transformation rules to target a tablet or a personal computer at the same time, and the IDE or development tool will select which transformation rules to apply. In this way, an abstract syntax tree may be shared.

Upon selection, the application is ported by generating code in block 312. Specifically, the abstract syntax tree is traversed, and pretty printed according to the transformational rules. Code generation may include the generation of wrapper code as described above. Code generation may also include the generation of infrastructural elements to optimize execution. For example, it may be appropriate to generate a runtime, or a helper library specific to the target architecture.

Inferring Component Types during Code Separation

Figure 4:
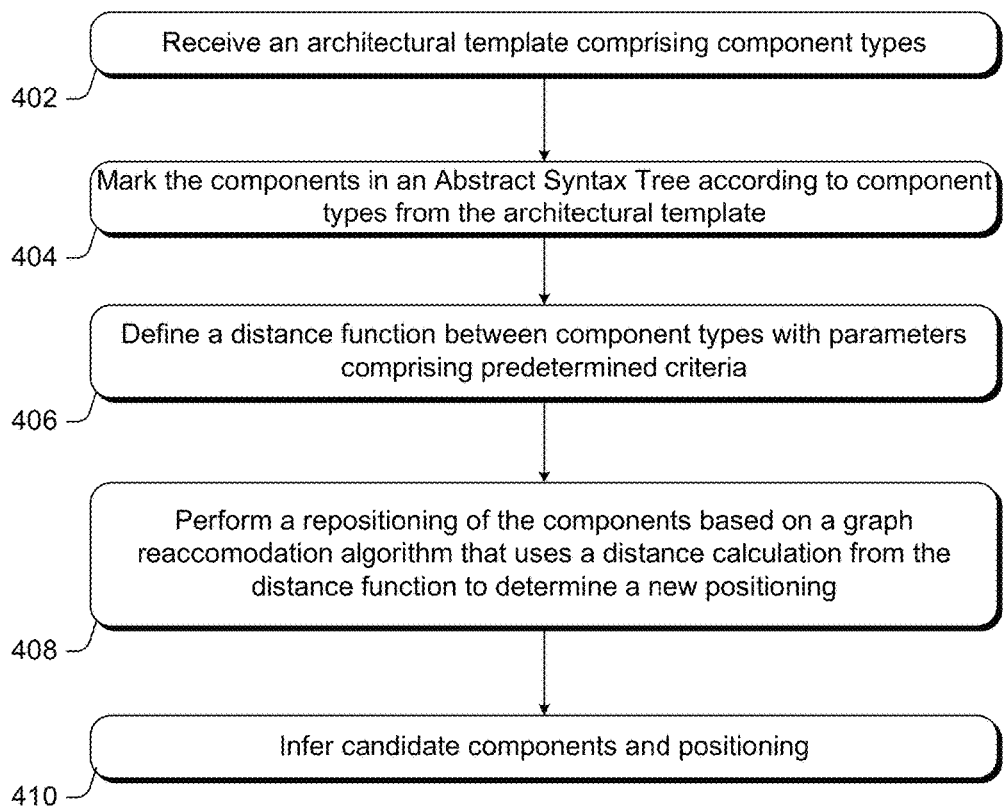
FIG. 4 is a flowchart of an exemplary operation of inferring components during code separation with semantic guarantees.

During code separation the code separation function infers which candidate components belong to a component type of the architectural template. Automated inference may be performed in a number of ways, but generally involves determining how similar a component is to a component type. FIG. 4 illustrates a flowchart of an exemplary embodiment 400 inferring a component type during code separation.

In block 402, the code separation function receives an architectural template comprising one or more component types as described with respect to FIG. 3 above.

Recall that at this point, there is an abstract syntax tree that supports input grammars of the programming languages of an original software application and output grammars of the programming languages of the target architecture. The abstract syntax tree also represents a parsing or static analysis of at least some of the source code the original software application. Accordingly, the abstract syntax tree contains components comprised of a functional source code block with an invocation interface that guarantees the semantic behavior of the functional source code block.

Thus in block 404, the code separation function marks the components in the abstract syntax tree as at least one of the component types of the architectural template. This results in an abstract syntax tree with a number of candidate components. It also results in a number of candidate components that are not necessarily organized by component type, and therefore may need repositioning.

To perform the repositioning, in block 406, a distance function for component types is defined in terms of parameters comprising predetermined criteria. A distance function for component types provides a similarity score for component to a component type. The distance function typically supports a metric, for example a Euclidean distance. In this way, the distance function provides a way to perform deterministic sorting where the components are ordered monotonically, based on similarity to a component type. This ordering is performed in block 408 by a graph re-accommodation algorithm that uses the distance function as a metric. Specifically, the graph re-accommodation algorithm repositions components based on similarity to a component type.

One consequence of the ability to perform ordered sorting by component type is that the code separation function can identify the outer boundaries of each component type. Therefore, the invocation interfaces on the outer boundaries may be configured to guarantee semantics, and the interior components that do not face components from other component types may potentially be refactored without changing semantics. For example, a middle tier object having a business object component type that faces client objects might not change its invocation interface, but a business objects that face other business objects might be merged or otherwise modified.

The distance function may be a function of one or more predetermined criteria which allow the distance to be weighted. Examples include, but are not limited to: component similarity, component affinity, and component performance based on component proximity. For component similarity, the distance measure may directly calculate how similar a component is to a component type. For component affinity, the distance measure may modify the calculation how similar a component is to a component type based on similarity to other components known to belong to that component type. For example, a radio button may be classified as a client component type if it is measured as similar to a standard button which was beforehand classified as a client component with high confidence. For component performance, the distance measure may be modified in terms of performance metrics. For example, a stateless business object that would ordinarily be grouped with other middle tier objects might be placed instead with client objects to limit network round trips. Thus even though the stateless business object is classified as a business object and likely would be placed in a middle tier, the distance measure may be weighted to place stateless business objects closer to the client component type.

The predetermined criteria may be have been received with an architectural template. For example an architectural template may have enumerated the advantages and disadvantages of a target platform. Based on those advantages and disadvantages, the distance function may be weighed to favor one component type over another, based on the characteristics of a component. The advantages and disadvantages may not be specific to component type, but may indicate a change in operation, such as in a service oriented architecture, specifying that some objects should be stateless objects to facilitate scalability. Alternatively, the predetermined criteria may be independent of architecture, and not necessarily have been received with an architectural template. For example, business policies and enterprise standards may be specified as the predetermined criteria for the distance function.

There are several examples of graph re-accommodation algorithms. One example is simulated annealing. Simulated annealing is a well-known algorithm where a large graph of objects may be organized. In the present example, the components comprise nodes in the graph, and the distance function defines the strength of connections between the nodes of the graph. The distance function is used to define a value to be tested for extrema (e.g. in this case typically a minima). After establishing an initial positioning, and the extrema value, the simulated annealing function iterates through potential re-positionings. Where a repositioning improves the extrema value (e.g. a lower value is discovered if testing for minima), the repositioning is replaces the prior positioning. When a predetermined threshold is satisfied, for example a time limit or a desired extrema threshold, the simulated annealing iteration stops. The components in the abstract syntax tree are then repositioned according to the final positioning determined by the simulated annealing algorithm.

Another example of a graph re-accommodation algorithm is to use develop a lattice comprising multiple dimensions, each dimension corresponding to a component type. Components are then placed in the lattice according to similarity to the component type. A force function describing affinity between the components is then described. A first repositioning is then effected by first applying the force function to determine the degree of repulsion between the components. A second repositioning is then effect by then applying the force function to determine the degree of attraction between the components. The result is a repositioning of the components where components of similar component type aggregate.

In general, the where the overall ordering of a system may be represented based on component distances based on the distance function, the system may be deterministically reordered such that the components aggregate to their likely component types. One may consider variations on linear programming where a tableau describing the graph of components may be pivoted to a desired extrema. Accordingly, this patent application describes various graph reaccommodation techniques without loss of generality.

Regardless of the graphic reaccommodation algorithm used, or the distance function used, once the candidate components are repositioned, in block 410 the code separation algorithm may infer which candidate components have which component types based on the repositioning. At this point, the repositioned abstract syntax tree is ready for code generation as described with respect to FIG. 3 above.

Example Use Cases

The aforementioned code separation techniques may be used for a number of transformations. By way of example, a typically application is to port a legacy client-server application to a web based service oriented architecture ("SOA").

In this example, the server portion of the client-server application is hosted on a web infrastructure such as a cloud infrastructure. The client application may continue to be accessible via a personal computer, but as a web application. Furthermore, the client application may also be ported to various tablet targets and/or mobile phone targets.

Figure 5:
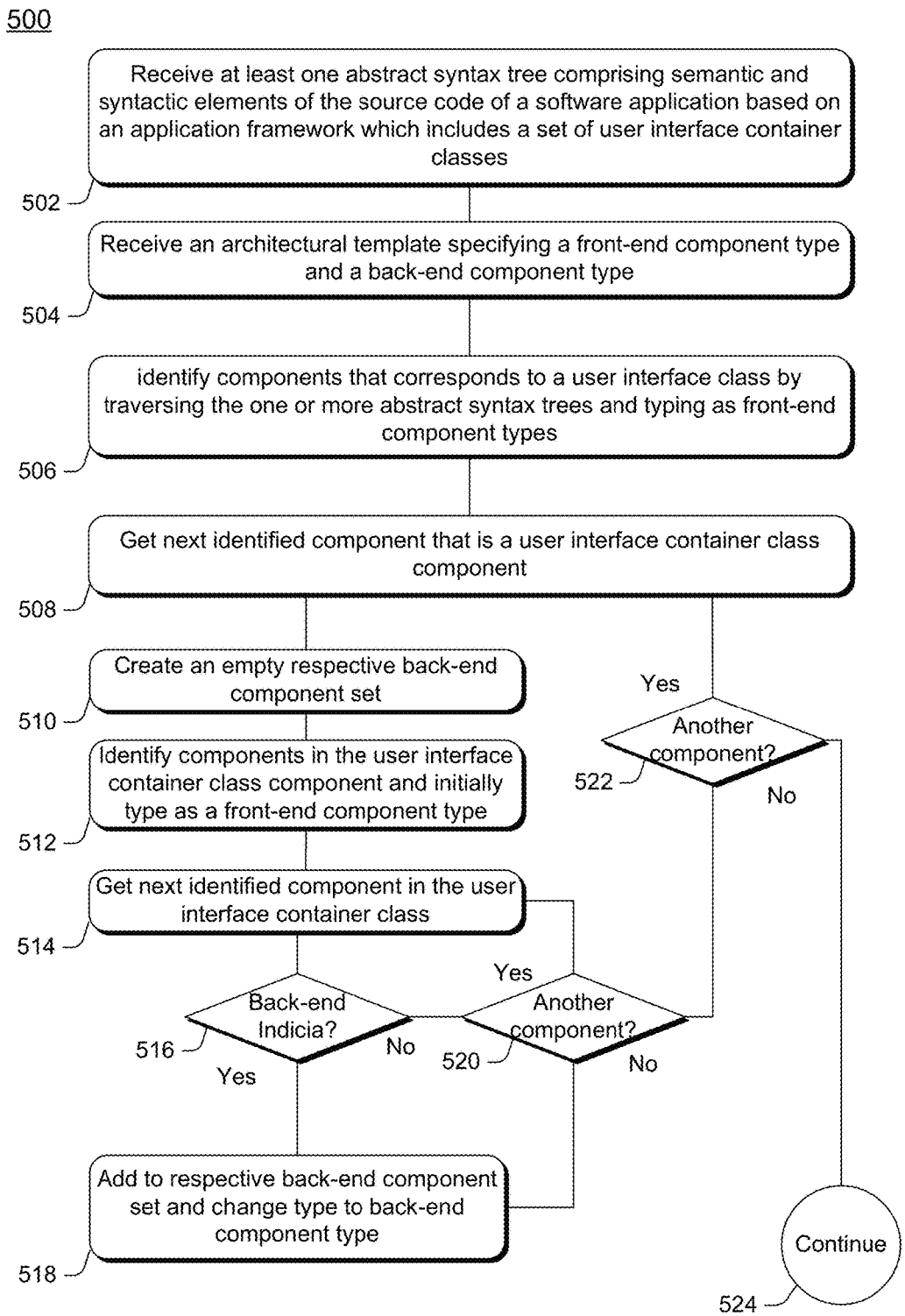
FIG. 5 is a flowchart of an exemplary operation of an MVVM rearchitecture using code separation with semantic guarantees.

A typical software architecture is the model-view-viewmodel, which is used as the target architecture. Therefore, component types of model, view, and viewmodel are derived from the target architecture. Roughly speaking, the model may be the client side local data model, such as an extensible markup language ("XML") data island. The view may correspond to a client hypertext markup language ("HTML") and cascading style sheet ("CSS") client with embedded JavaScript that accesses the XML data island. Finally, the viewmodel may be a server side web service that serves the data island. FIG. 5 illustrates a flowchart of an exemplary embodiment of code separation with semantic guarantees in a port to a model-view-viewmodel target architecture.

As described with respect to FIG. 3 above, source code for a software application may be parsed or statically analyzed to generate one or more abstract syntax trees that capture the semantic and syntactic elements of the source code. In the present MVVM example, we assume the software application is written using an application framework that includes one or more user interface container classes. For example, .NET™ may include a Windows Form, and the Microsoft Foundation Classes™ include Dialog Box, Form, and Window and Document-View classes. In block 502 of embodiment 500, one or more abstract syntax trees for the software application are received.

In block 504, an architectural template specifying a front-end component type and a back-end component type is received. In the present example, the model-view portion of the target architecture corresponds to the front-end component type and the viewmodel portion of the target architecture corresponds to the back-end component type. Other mappings may exist. For example a view-controller portion of a model-view-controller architecture may correspond to the front-end component type and the model portion may correspond to the back-end component type. Thus while the present example is directed to MVVM architectures, other architectures with a front-end component type and a back-end component type are supported without loss of generality.

In block 506, the abstract syntax trees are traversed or otherwise queried for all instances of components that are a user interface container class in the application framework. Those components are then typed as front-end component types.

In block 508, the identified user interface container components are iterated. For each user interface container component, all components contained by the container class are grouped together. In block 510, a respective back-end component set is created. At this point, the back-end component set starts as an empty set.

In block 512, the components contained by the container class are iterated through. As each component is iterated in block 514, the code separation function seeks back-end indicia for the component in block 516. If back-end indicia are detected, then in block 518, the component is added to the respective back-end component set and the component type is changed to back-end component type. Otherwise, in block 520, the next component is retrieved. If the iteration is complete, then execution proceeds to block 522.

There are a number of back-end indicia. For example, the attributes of a component may be reviewed for references. If the references are made solely by business logic or persistence functions, then the component may be likely to be a back-end component. Framework class type may also assist. Many classes in an application framework are known to be either front-end or back-end types. Accordingly, the application framework type may be indicia of being a back-end component type (or not being a back-end component type). In other situations, a component may be compared to another component known to be a back-end component type. Where the similarity satisfies a predetermined threshold, the component may be determined to be a back-end component type.

The foregoing is not intended to be an exhaustive list of back-end indicia. Where an IDE or development tool is used in the code separation process, a technician may identify new heuristics or back-end indicia, and may modify the code separation process accordingly.

Example Extensibility Library-Based Transformation Operations

Figure 6:
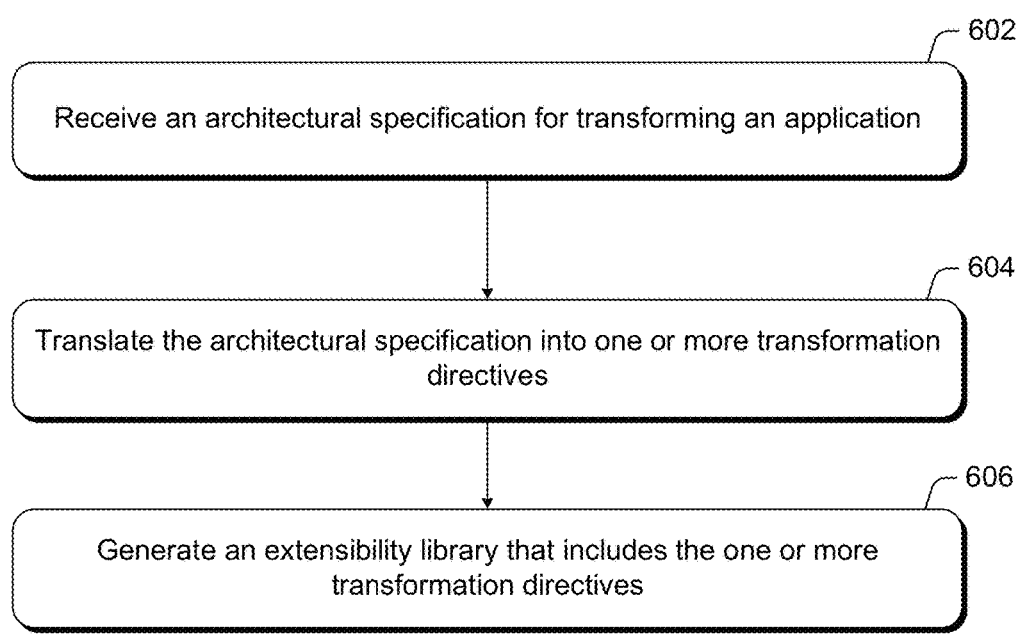
FIG. 6 is a flowchart of an exemplary operation that generates an extensibility library that includes one or more transformation directives.
Figure 7:
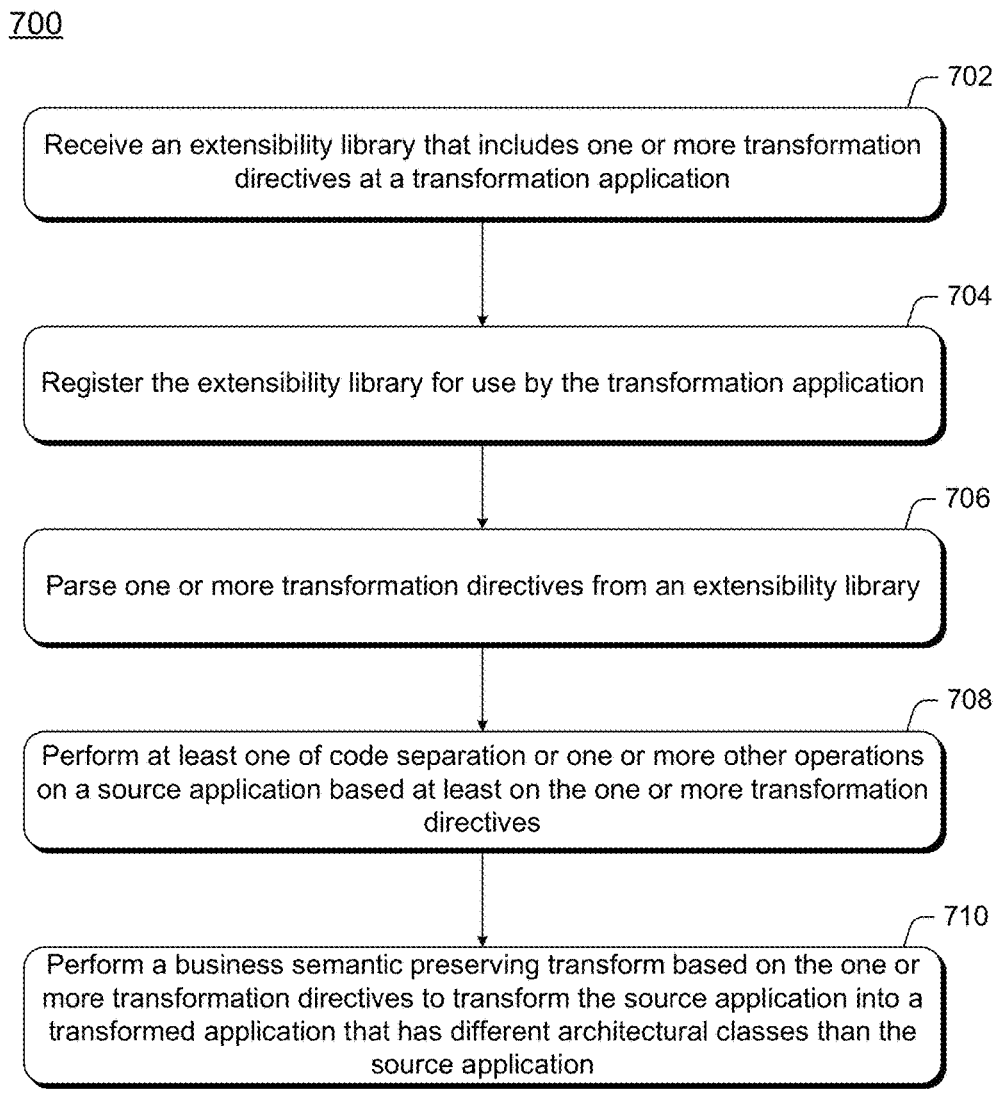
FIG. 7 is a flowchart of an exemplary operation that uses an extensibility library to transform a source application into a transformed application that preserves business semantics from the source application.

FIGS. 6-8 describe various example processes for performing transformation operations based on extensibility libraries. The order in which the operations are described in each example process is not intended to be construed as a limitation, and any number of the described operations may be combined in any order and/or in parallel to implement each process. Moreover, the operations in each of the FIGS. 6-8 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 6 is a flowchart of an exemplary operation that generates an extensibility library that includes one or more transformation directives. In block 602 of the embodiment 600, the directive generation module 242 may receive an architectural specification for transforming an application. The directive generation module 242 may be a standalone application or a part of the application 224. The architectural specification may be for a target execution scenario, a target platform, or target form factor. In various embodiments, the directive generation module 242 may receive the architectural specification in the form of user inputted parameters or an architectural model.

In block 604, the directive generation module 242 may translate the architectural specification into one or more transformation directives. In various embodiments, the directive generation module 242 may compare the architectural specification with an original architecture of a source application. The comparison may enable the directive generation module 242 to infer one or more of code separation directives, code transformation directives, and/or grammar translation directives.

In block 606, the directive generation module 242 may generate an extensibility library that includes the one or more transformation directives. For example, the directive generation module 242 may combine the one or more transformation directives to create an extensibility library, or modify an existing extensibility library into a modified extensibility library that include the one or more transformative directives. Alternatively, the directive generation module 242 may transform the one or more transformation directives into a set of instructions interpretable by a run time or execution engine. In yet another alternative, the directive generation module may consolidate the one or more transformation directives into a single file that may then be directly interpreted. In various embodiments, the extensibility library that is generated may be formatted in a way that obscures the transformation details contained in the one or more transformation directives.

FIG. 7 is a flowchart of an exemplary operation that uses an extensibility library to transform a source application into a transformed application that preserves business semantics from the source application. In block 702 of the embodiment 700, a transformation application, such as the application 224, may receive an extensibility library that includes one or more transformation directives. In some embodiments, the application 224 may receive the extensibility library from an external source via the extensibility module 240. In other embodiments, the extensibility module 240 of the application 224 may receive the extensibility library from the directive generation module 242.

In block 704, the extensibility module 240 may register the extensibility for use by the application 224. The registration may enable the application 224 to perform code transformations for a source application using the extensibility library in addition to or in place of transformation rules that are derived from the abstract syntax tree 104. In block 706, the transformation module 238 of the application 224 may parse one or more transformation directives from an extensibility library. The transformation directives may include user coded directives and/or directives that are automatically generated by a directive generation module, such as the directive generation module 242. The transformation directive may be generated based on an architectural specification.

In block 708, the transformation module 238 may perform at least one of code separation or one or more other operations on a source application based at least one of the one or more transformation directives. In some instances, the code separation may be performed using a combination of the one or more transformation directives and one or more transformation rules that are derived from the abstract syntax tree 104.

In block 710, the transformation module 238 may perform a business semantic preserving transform based on the one or more transformation directives. The business semantic preserving transform may transform the source application having one or more original architectural classes into a transformed application having one or more transformed architectural classes. The one or more original architectural classes may have at least one difference from the one or more transformed architectural classes. In various embodiments, the application 224 may perform the transformation using one or more techniques described in FIGS. 3 and 4, with the exception that the application 224 may use the one or more transformation directives in addition to or in place of transformation rules that are derived from the abstract syntax tree 104.

FIG. 8 is a flowchart of an exemplary operation that transforms source application components into transformed application components based on transformation directives from an extensibility library. The flowchart in FIG. 8 further illustrates the block 708 of the embodiment 700. In block 802 of the embodiment 800, the transformation module 238 may transform at least one source application component of a first set of grammars into one or more transformed components of a second set grammars. The transformation module 238 may perform the transformation based at least on the one or more transformation directives of an extensibility library. In some instances, such transformation may be performed using a combination of the one or more transformation directives of the extensibility library and one or more transformation rules that are derived from the abstract syntax tree 104.

In block 804, the transformation module 238 may transform a source application component into multiple source application components. Alternatively, the transformation module 238 may transform multiple source application components into a single transformed component. The transformation module 238 may perform such transformations based at least on the one or more transformation directives of the extensibility library. In some instances, such transformations may be performed using a combination of the one or more transformation directives of the extensibility library and one or more transformation rules that are derived from the abstract syntax tree 104.

In block 806, the transformation module 238 may perform other transformations using the transformation directives in the extensibility library. In various embodiments, such transformations may include skinning a user interface component of the source application, transformation the source application to suit a different hardware platform paradigm, i.e., operate on a different type of hardware platform, and/or so forth. Further, the transformation module 238 may perform transformations in any combination of one or more of the blocks 802-806 based on the transformation directives in the extensibility library.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A system, comprising:
one or more processors;
memory that includes a plurality of computer-executable components that are executable by the one or more processors, comprising:
an extensibility library that includes one or more transformation directives, the one or more transformation directive specifying a business semantic preserving transform that transforms at least one source application component of a source application into one or more transformed application components of a transformed application, the business semantic preserving transform as specified by the one or more transformation directives of the extensibility library causes an execution of transformed code of the one or more transformed application components of the transformed application in a new execution scenario to produce an identical semantic effect as an execution of source code of the at least one source application component of the source application in an old execution scenario; and an transformation application that transforms the source application into the transformed application using the business semantic preserving transform, the business semantic preserving transform changing one or more original architectural classes of the source application into one or more transformed architectural classes of the transformed application, the one or more original architectural classes having at least one architectural difference from the one or more transformed architectural classes.

2. The system of claim 1, wherein the at least one architectural difference resulted from a transformation of multiple source application components of the source application into a single transformed application component of the transformed application, or a transformation of a single source application component of the source application into multiple transformed application components of the transformed application based at least on the one or more transformation directives.

3. The system of claim 1, wherein the at least one architectural difference resulted from a transformation of a source application component of the source application into transformed application components of the transformed application according to an architectural specification outlined by the one or more transformation directives, the transformed application components occupying multiple tiers that include a user interface tier, a middleware tier, and a database tier.

4. The system of claim 1, wherein the at least one architectural difference resulted from a transformation of a source application component of the source application having a first set of grammars into a transformed application component of the transformed application having a second set of grammars, wherein the first set of grammars and the second set of grammars are associated with different programming paradigms.

5. The system of claim 1, wherein the at least one architectural difference resulted from a transformation of a source application component of the source application that executes on an original hardware platform into a transformed application component of the transformed application that executes on a new hardware platform, the original hardware platform having a different hardware paradigm than the new hardware platform.

6. The system of claim 1, wherein the business semantic preserving transform further includes transforming a source application component of the source application into a transformed application component of the transformed application via a skinning of the source application component.

7. The system of claim 1, wherein the transformation application transforms a source application component of the source application based at least on the one or more transformation directives without recompilation of the extensibility library.

8. The system of claim 1, wherein a format of the extensibility library obscures transformation details of the one or more transformation directives.

9. A method, comprising:
receiving and extensibility library that includes one or more transformation directives that specify a business semantic preserving transform that transforms at least one source application component of a source application into one or more transformed application components of a transformed application, the business semantic preserving transform as specified by the one or more transformation directives of the extensibility library causes an execution of transformed code of the one or more transformed application components of the transformed application in a new execution scenario to produce an identical semantic effect as an execution of source code of the at least one source application component of the source application in an old execution scenario;
registering the extensibility library to a transformation application such that the transformation application accesses the one or more transformation directives;
receiving the source application having one or more original architectural classes;
performing, via the transformation application, code separation by identifying one or more candidate components in the source application through querying an abstract syntax tree (AST) that includes transformation directives from the extensibility library, and mapping the one or more candidate components in the source application to a target architecture of the transformed application that includes one or more transformed architectural classes that abstract away a physical configuration of underlying hardware; and
transforming, via the transformation application, the source application into the transformed application using the business semantic preserving transform, the business semantic preserving transform changing one or more original architectural classes of the source application into the one or more transformed architectural classes of the transformed application, the one or more original architectural classes having at least one architectural difference from the one or more transformed architectural classes.

10. The method of claim 9, wherein the at least one architectural difference resulted from a transformation of multiple source application components of the source application into a single transformed application component of the transformed application, or a transformation of a single source application component of the source application into multiple transformed application components of the transformed application based at least on the one or more transformation directives.

11. The method of claim 10, further comprising at least one of:
calculating a transformation accuracy confidence level for the transformation of the single source application component into multiple transformed application components and displaying an indicia of the accuracy confidence level; or
calculating a functionality preservation confidence level for the business semantic preserving transform of the one or more original architectural classes of the source application into the one or more transformed architectural classes of the transformed application.

12. The method of claim 11, further comprising displaying an identity of a transformation directive and an identity of the extensibility library used to transform at least one source application component along with the indicia of the accuracy confidence level.

13. The method of claim 9, wherein the at least one architectural difference resulted from a transformation of a source application component of the source application into transformed application components of the transformed application according to an architectural specification outlined by the one or more transformation directives, the transformed application components occupying multiple tiers that include a user interface tier, a middleware tier, and a database tier.

14. The method of claim 9, wherein the at least one architectural difference resulted from a transformation of a source application component of the source application having a first grammar into a transformed application component of the transformed application having a second grammar, wherein the first grammar and the second grammar are associated with different programming paradigms.

15. The method of claim 9, the at least one architectural difference resulted from a transformation of a source application component of the source application that executes on an original hardware platform into a transformed application component of the transformed application that executes on a new hardware platform, the original hardware platform having a different hardware paradigm than the new hardware platform.

16. The method of claim 9, wherein the business semantic preserving transform include at least one of an insertion of a debug breakpoint, an insertion of a trace debugging instruction, an insertion of a pre-condition assertion or a post-condition assertion, an insertion of a profiling point, or localizing the source application to a new locale.

17. The method of claim 9, further comprising displaying execution of multiple transformed application components in a preview interface of the transformation application.

18. The method of claim 9, further comprising:
  receiving an architectural specification for the transformed application; and
  generating the extensibility library based at least on the architectural specification for the transformed application.

19. The method of claim 9, wherein a format of the extensibility library obscures transformation details of the one or more transformation directives.

20. One or more non-transitory computer-readable media storing computer-executable instructions that are executed to cause one or more processors to perform acts comprising:
  registering one or more transformation directives of an extensibility library to a transformation application such that the transformation application accesses the one or more transformation directives, the one or more transformation directives specifying a business semantic preserving transform that is guaranteed by annotations in an abstract syntax tree to transform at least one source application component of a source application into one or more transformed application components of a transformed application; and
  transforming, via the transformation application, the source application into the transformed application using the business semantic preserving transform, the business semantic preserving transform changing one or more original architectural classes of the source application into one or more transformed architectural classes of the transformed application, the one or more original architectural classes having at least one architectural difference from the one or more transformed architectural classes,
  wherein the business semantic preserving transform as specified by the one or more transformation directives of the extensibility library causes an execution of transformed code of the one or more transformed application components in a new execution scenario to produce an identical semantic effect as an execution of source code of the at least one source application component in an old execution scenario.

* * * * *